United States Patent [19]
Magliozzi

[11] Patent Number: 5,453,943
[45] Date of Patent: Sep. 26, 1995

[54] ADAPTIVE SYNCHROPHASER FOR REDUCING AIRCRAFT CABIN NOISE AND VIBRATION

[75] Inventor: Bernard Magliozzi, West Suffield, Conn.

[73] Assignee: United Technologies Corporation, Hartford, Conn.

[21] Appl. No.: 199,000

[22] Filed: Feb. 18, 1994

[51] Int. Cl.⁶ .................................................. B64C 11/50
[52] U.S. Cl. ........................ 364/574; 364/505; 364/508; 381/71; 244/1 N; 416/34; 416/500
[58] Field of Search ...................................... 364/574, 508, 364/505; 416/33, 34, 500; 244/1 N; 381/71

[56] References Cited

U.S. PATENT DOCUMENTS

| | | | |
|---|---|---|---|
| 4,245,955 | 1/1981 | Lambertson | 416/34 |
| 4,653,981 | 3/1987 | Harner et al. | 416/34 |
| 4,715,559 | 12/1987 | Fuller | 244/1 N |
| 4,947,356 | 8/1990 | Elliott et al. | 364/574 |
| 5,058,376 | 10/1991 | Snow | 60/204 |
| 5,093,791 | 3/1992 | Schneider et al. | 364/431.01 |
| 5,148,402 | 9/1992 | Magliozzi et al. | 364/574 |
| 5,150,855 | 9/1992 | Kaptein | 244/1 N |
| 5,221,185 | 6/1993 | Pla et al. | 364/574 |

Primary Examiner—Emanuel T. Voeltz
Assistant Examiner—Kyle J. Choi
Attorney, Agent, or Firm—Donald S. Holland; Holland & Associates

[57] ABSTRACT

An "adaptive synchrophaser" is disclosed for modifying the phase angle relationship between aircraft propellers to reduce cabin noise and/or vibration. Rather than use a constant pre-selected angle for a specific passenger cabin configuration during a particular flight mode (e.g., during liftoff or cruise), the synchrophaser periodically monitors actual operating conditions and modifies the phase angle accordingly. In the preferred embodiment, a plurality of transducers (microphones) are installed at several cabin locations to sample noise periodically. The signals are then transmitted via a signal conditioner, a multiplexer and an analog-to-digital converter to a signal processor. The processor calculates the maximum acoustic noise at each microphone location for all possible phase angles. It then identifies the optimum phase angle that resulted in the lowest maximum noise anywhere in the cabin, and signals a synchrophaser to set that angle. This process not only reduces noise based on actual on-going conditions, but also balances the cabin noise so that there are not any "hot" seats with high noise levels.

14 Claims, 3 Drawing Sheets

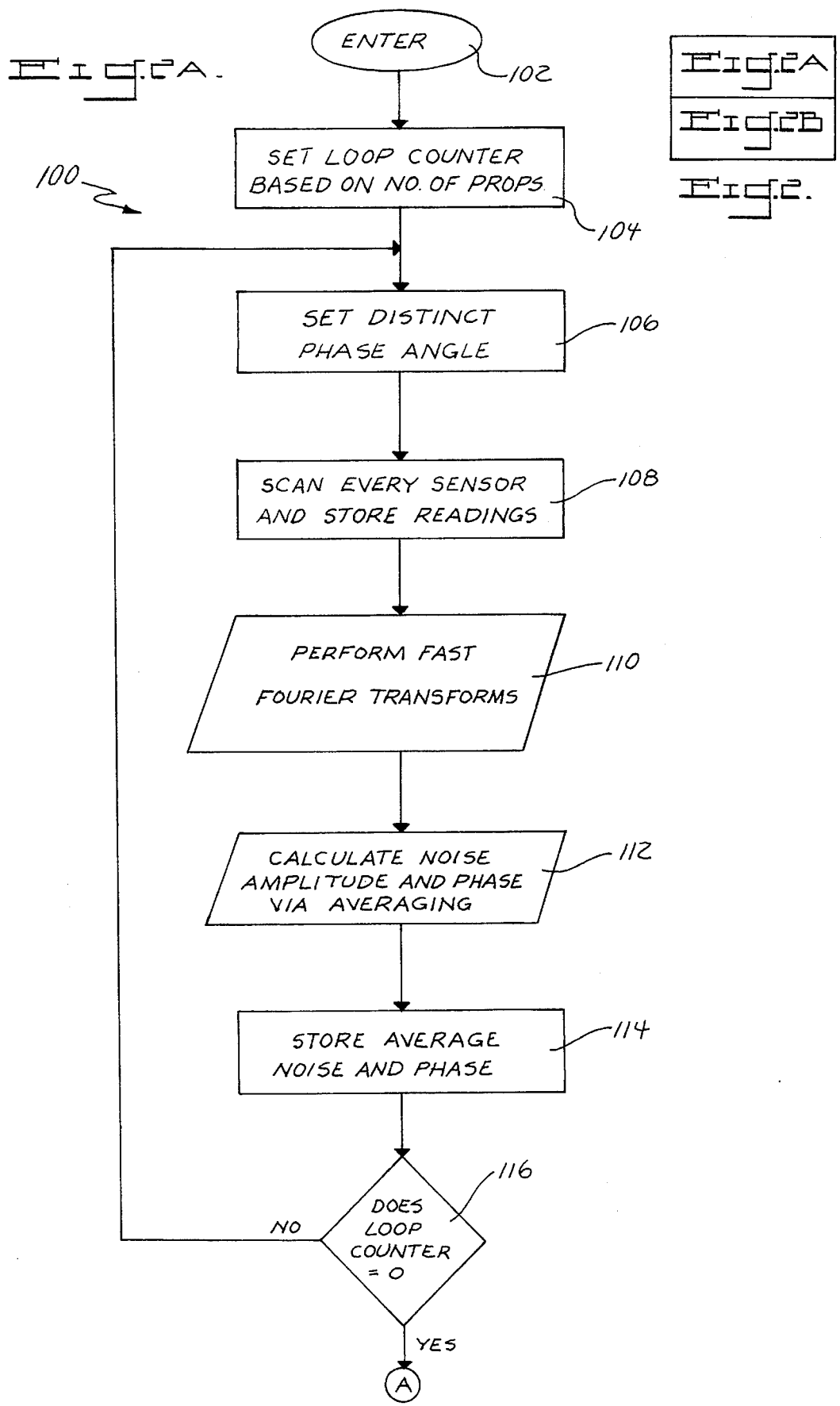

ADAPTIVE SYNCHROPHASER FOR REDUCING AIRCRAFT CABIN NOISE AND VIBRATION

BACKGROUND OF THE PRIOR ART

This invention relates to apparatus and methods for controlling cabin noise and vibration in propeller driven aircraft.

As described in U.S. Pat. No. 5,148,402 to Magliozzi et al., the asynchronous operation of propellers on multi-engine aircraft creates cabin noise and vibration. Each propeller creates airflow disturbances and beats as its blades turn through the air rushing by. Also, rotor imbalance acts on the propeller rotor shaft and is transmitted to and excites the aircraft structure.

On short trips, the acoustic noise and vibration may be bearable to cabin passengers. But on longer trips, the constant hum and vibration begins to wear on passengers and crew.

Conventional methods have been employed to try to cancel out the noise and vibration. Some are strictly electrical devices. They use microphones to sense cabin conditions, and send negative-phase electrical responses back to the cabin through strategically placed loudspeakers. These responses, though not instantaneous, tend to dampen the noise somewhat. They do little, however, to alleviate vibration.

Other conventional systems try to solve both problems. They use synchrophasing, in which the phase angle relationship between the rotating propellers is kept constant during a flight mode (e.g., liftoff or cruise). Each angle is pre-selected such that it promotes cancellation among the sources of noise and vibration. This requires a stable synchrophasing system of relatively good accuracy. Also, the phase angle required depends upon both the specific installation and the actual operating condition (particularly the propeller speeds). These prior systems typically employ synchrophasers which preset the possible propeller phase angles based upon testing of the development aircraft operating at selected nominal conditions. This approach does not generally provide the optimum phase angle to reduce cabin noise and vibration, since operating conditions and propeller speeds differ during various flights. A more flight condition-responsive synchrophaser is therefore needed.

Because of the cancellation/reinforcement functions of prior synchrophasers, it is also possible (for a chosen phase angle) that strong cancellation (and therefore low noise levels) can occur at one location in a cabin, while reinforcement (and therefore high noise levels) can occur at some other location in the cabin. It would therefore be desirable if a synchrophaser could also select the phase angles to balance the cabin noise so that there does not simultaneously exist any low noise locations and high noise locations.

Accordingly, it is a principal object of the present invention to provide an "adaptive synchrophaser" that overcomes the problems of the prior art.

It is another general object to provide a synchrophaser that readily adapts to ongoing flight conditions to properly adjust phase angle differences between propellers to cancel the sources of noise and vibration.

It is a more specific object to provide an "adaptive synchrophaser" that periodically samples the cabin noise and vibration environment, performs the desired analyses, and provides optimum phase angles for the actual configuration and operating conditions.

It is another specific object to provide an "adaptive synchrophaser" that can be incorporated into a synchrophaser or which could be a separate box that would work with an existing synchrophaser.

SUMMARY OF THE INVENTION

An "adaptive synchrophaser" is disclosed for periodically modifying the phase angle relationship between propellers during aircraft flight. In the preferred embodiment, a plurality of microphones disposed at various locations in the cabin are monitored to sample cabin acoustic noise. The signals are sent to a signal processor, which calculates the acoustic noise at each microphone location for all combinations of possible propeller shaft phase angles. The processor scans the noise level at each microphone location. The maximum noise level that occurs at each phase angle is noted, and stored in the processor. After the maximum noise levels have been computed for all possible phase angles, the stored data is examined to identify the phase angle that resulted in the lowest maximum noise level. That phase angle is then sent to a synchrophaser to adjust the phase relation between the propellers to cancel noise. By sampling the "high spots" (i.e., the cabin locations having the maximum noise levels), this also insures that the lowest noise level is attained at any cabin location without exceeding that level at any other location. This avoids any "hot" seats in the airplane cabin.

The above and other objects of the present invention will becomes more readily apparent when the following detailed description is read in conjunction with the accompanying drawings.

DETAILED DESCRIPTION OF THE PREFERRED EMBODIMENTS

Figure 1:
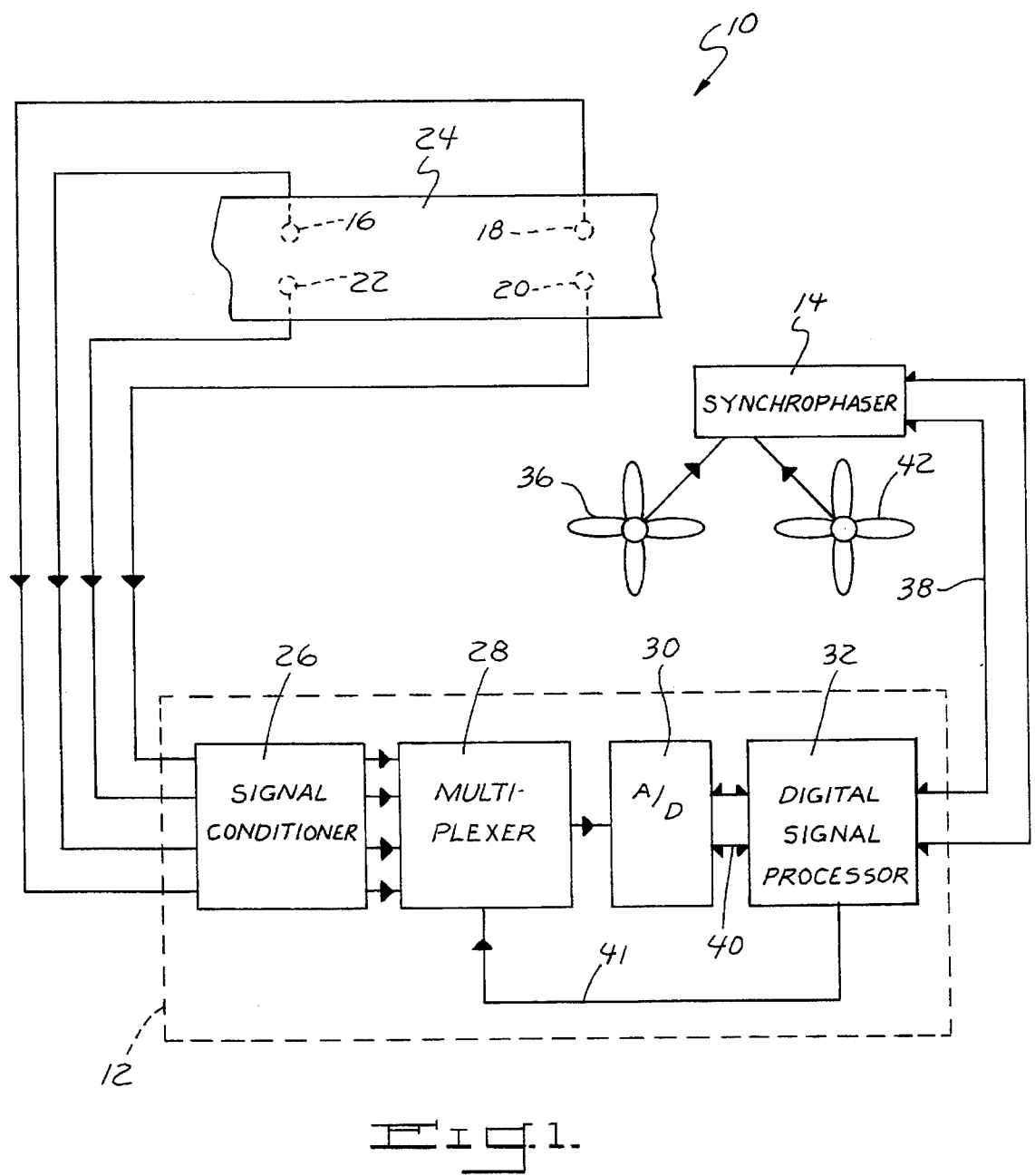
FIG. 1 is a schematic of an "adaptive synchrophaser" system constructed in accordance with the present invention.

Referring to the drawings in detail, the "adaptive synchrophaser" system consists of hardware 10 (see FIG. 1) and software 100 (see FIG. 2). The hardware 10 could be a separate box 12 that works with an existing synchrophaser 14; or it could be incorporated into a single unit with the synchrophaser 14. For simplicity, it is being described herein as working in conjunction with the synchrophaser of U.S. Pat. No. 4,947,356 to Elliott et al. That patent is hereby incorporated by reference. Hardware 10 preferably comprises at least twenty transducers, such as microphones 16, 18, 20, 22, installed at several locations in the cabin 24 for the propeller-driven airplane (not shown); a signal conditioner 26 to shape the signals from the transducers; a multiplexer 28 to receive the conditioned signals and transmit them to an analog-to-digital converter 30; and a digital signal processor 32 that receives the signals to sample the cabin noise, perform the desired analyses, and provide the synchrophaser 14 with optimum phase angles for the actual configuration and operating conditions.

The microphones (e.g., 16, 18, 20, 22) can be standard commercial units, requiring only stable sensitivity and good phase linearity over the frequency range of interest, typically 50 to 500 Hz for turboprop aircraft. They can be installed in seat backs or in overhead panels. Note that these microphones could be pre-existing, such as those used on an active noise control system, like that in Elliott et al.

Typically, a large number of "transducer" channels (twenty or more) will be used to generate an adequate sampling for proper analysis. Their signals are sent, in the illustrated hardware 10, to the sole signal conditioner 26. It has amplifiers and impedance matching circuits. Alternatively, multiple conditioners could be used for each "transducer" line, especially where multiple types of devices are used.

The conditioned signals are transmitted to multiplexer 28. Like conditioner 26, multiplexer 28 has sufficient inlet ports to handle the multiple channels at 500 Hz. It selects one signal at a time to pass to the analog-to-digital converter or A/D 30.

In the preferred embodiment, A/D 30 has to be sufficiently fast to handle the twenty "transducer" signals at 500 Hz. It has a sample-and-hold circuit for those signals.

The digital signal processor 32 can comprise any suitable single-chip microcomputer having RAM and ROM on board, such as commercial units manufactured by the Intel Corporation of Santa Clara, Calif. It senses a position signal from the aircraft's master propeller 36, via a databus line 38 from the synchrophaser 14. The "propeller position" signal is a pulse, generated once per propeller revolution, by a magnetic pickup. The processor 32 transmits this periodic signal through another databus line 40 to the A/D 30. This synchronizes the A/D 30 to the propeller position, and triggers it to send a synchronously sampled digitized image of the noise signal from each microphone for handling by the signal processor.

Figure 2B:
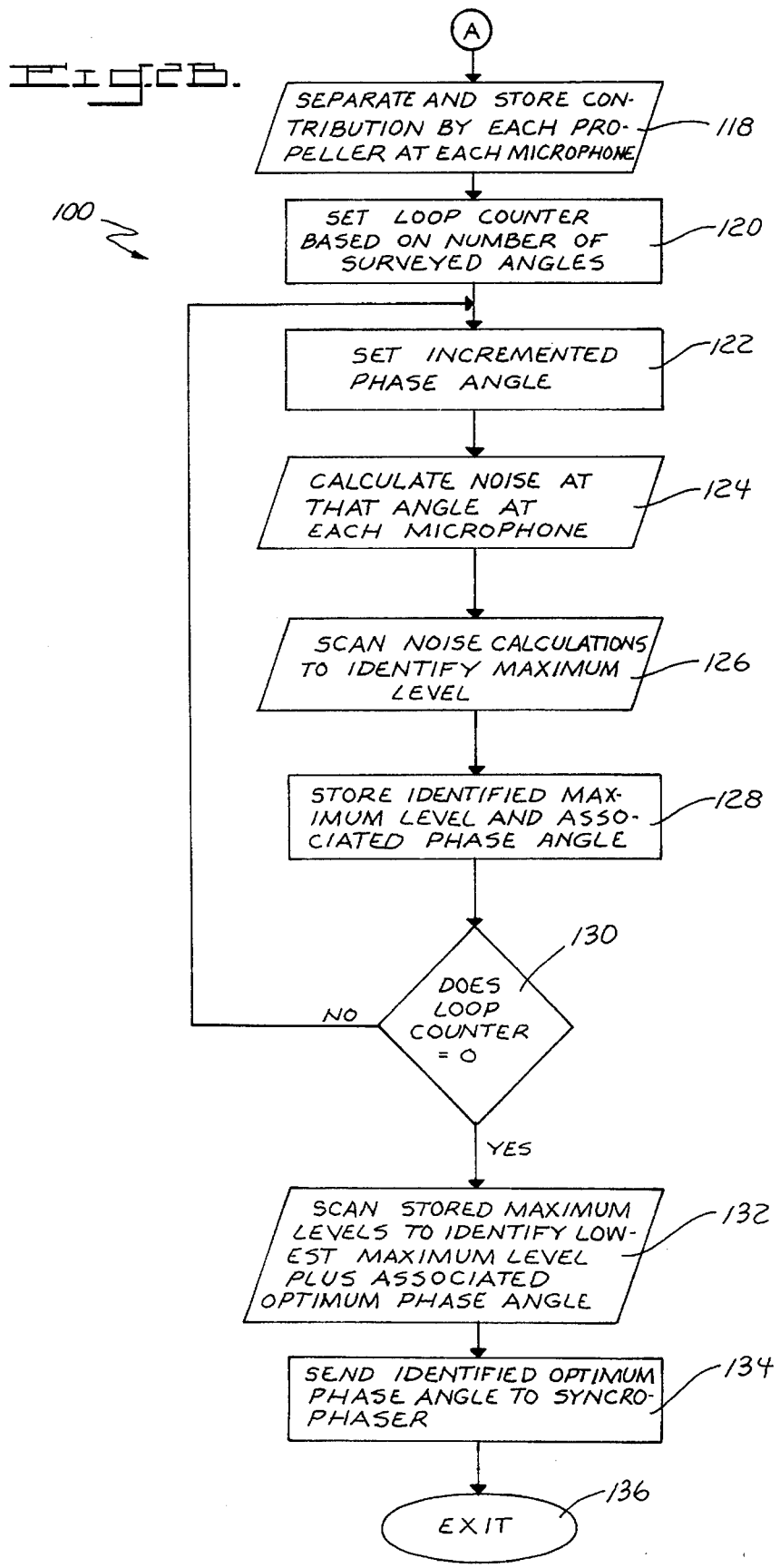
FIG. 2 is a flowchart, split into FIGS. 2A and 2B, of a software program used to operate the FIG. 1 system.

In addition to controlling the A/D 30 and multiplexer 28 (through line 41), the processor 32 also controls the synchrophaser 14 via the software 100 shown in flowchart form in FIGS. 2A, 2B.

Beginning after an enter step 102 in FIG. 2A, a counter is set (in step 104) to the total number of propellers in the aircraft—here, two to represent the master propeller 36 and slave propeller 42 shown in FIG. 1. Though only twin propellers are shown in the illustrated example, this invention is applicable to aircraft having more than two engines. It is also applicable to propfans and turbofans.

Next, the control program 100 commands the synchrophaser 14 (in step 106) to set a distinct shaft phase angle relationship between the master and slave propellers.

Once the phase angle has been set and steady-state has been achieved, the microphones (e.g., 16, 18, 20, 22) are scanned, digitized and stored (step 108); then Fourier analyzed (sub-routine step 110). Several fast Fourier Transforms from each microphone are performed (step 110) and averaged (step 112) to improve statistics. Determined from the Fourier analyses are the averaged amplitudes and phases (relative to the propeller shaft position pulses) of the propeller tones (harmonics of blade-passing-frequency= (N)(RPM)(B)/60, where N is the harmonic number, RPM is the propeller rotation rate in revolutions per minutes, and B is the number of blades). After a set of averaged data for all microphones has been determined, it is stored (step 114).

Once the base amplitudes and phases have been stored, the next step 116 calls for the counter to decrement by one. The counter, set initially at two, is now at one. Since the counter does not read zero, the sub-routine loops back to step 106, whereupon the synchrophaser is commanded to set a second, different predetermined phase angle (step 106).

The microphones are again scanned, digitized, Fourier analyzed, and stored (steps 108–114).

After the counter decrements to zero, the routine program passes to step 118 (see FIG. 2B). In it, the two previously stored sets of propeller tone noise amplitudes and phases (from step 114) are solved in pairs as linear systems of equations with two unknowns to determine the amplitudes and phases relative to the propeller position pulse of each harmonic from each propeller utilizing the following general equation:

$$P(t) = A_1 e^{i(\omega_1 t + \phi_1)} + A_2 e^{i(\omega_2 t + \phi_2)}$$

where P is the accoustic pressure, A is the amplitude of the noise of propeller n (n being the propeller number), $\omega$ is the frequency of the noise and $\phi$ is an arbitrary phase reference angle.

When synchrophased ($\omega_1 = \omega_2 = \omega$) with propeller shaft phase angle $\Theta$ at harmonic m, this equation translates to:

$$P_m(t) = B_m e^{i(\omega_m t + \psi_m)} = A_{1,m} e^{i(\omega_m t + \phi_{1,m})} + A_{2,m} e^{i(\omega_m t + \phi_{2,m} + mB\Theta)}$$

where m equals the particular harmonic (typically measured as one of the first five harmonics), B is the number of blades on the particular propeller, and $\psi$ equals the sum of $\phi_1$ and ($\phi_2 + mB\Theta$).

By factoring out $e^{i\omega t}$ to deal only with sine wave amplitudes and phases, this equation simplifies to:

$$B_m e^{i\psi_m} = A_{1,m} e^{i\phi_{1,m}} + A_{2,m} e^{i(\phi_{2,m} + mB\Theta)}$$

Setting two synchrophaser angles $\Theta_1$ and $\Theta_2$ (still in step 118) leaves the following two linear equations:

$$B_{1,m} e^{i\psi_{1,m}} = A_{1,m} e^{i\phi_{1,m}} + A_{2,m} e^{i(\phi_{2,m} + mB\Theta_1)}$$

and $$B_{2,m} e^{i\psi_{2,m}} = A_{1,m} e^{i\phi_{1,m}} + A_{2,m} e^{i(\phi_{2,m} + mB\Theta_2)}$$

Solving for $A_{1,m}$, $A_{2,m}$, $\phi_{1,m}$, $\phi_{2,m}$ characterizes the system at each harmonic, m. It separates the contribution by each propeller (here, props 36, 42) at each microphone location. By targeting only the propeller noise harmonics, other noise sources (such as the environmental control system, passengers talking or moving, etc.) are largely eliminated and will not contaminate the analysis.

After the noise amplitudes $A_{1,m}$, $A_{2,m}$ and phases $\phi_{1,m}$, $\phi_{2,m}$ have been determined relative to propeller position as described above, they are stored in sub-routine step 120 of the control program.

The source separation now allows the resulting propeller noise for each harmonic at each microphone location to be synthesized for any synchrophaser phase angle from:

$$SPL_m(\Theta) = 20 \log_{10} \left[ \sum_{n=1}^{N} A_{n,m} e^{i(\phi_{n,m} + mB\Theta_n)} \right] + Reference$$

where the base amplitudes and reference phases ($A_{n,m}$, $\phi_{n,m}$) have been set or determined, as described above. SPL represents the sound pressure level (or noise) from the propellers at any given location at harmonic m, and $\Theta_n$ is the shaft phase angle of propeller n. By predetermining the base amplitudes and phases, the SPL can be predicted for any $\Theta_n$ combination. It should be noted that whereas the A and $\phi$ values depend upon locations in the cabin, there is only one set of $\Theta_n$ available.

The analysis would then proceed with a search for the best combination of Θ(s) to reach the best cabin noise level. To achieve this, a second loop counter is initially set to the number of all possible shaft phase angles that can be surveyed (step 120). (Note that these angles are surveyed mathematically, e.g., at 1° increments, and not restricted to the particular synchrophaser accuracy or resolution.) A starting phase angle is then set mathematically (step 122). After, the noise level at that angle is calculated at each microphone location (step 124). Since the noise levels may differ from one location to another, they are scanned (in step 126) to identify the maximum noise level at any of the microphones. That identified maximum is stored, along with the associated angle (step 128).

Once the calculation is complete for the starting angle, the counter decrements by one (step 130). The sub-routine then loops back to step 122. A new phase angle is incremently set, and the maximum noise level is identified and stored. This process is repeated until all the possible angles (three hundred sixty of them, if 1° increments) have been checked.

When the counter eventually reads zero (in step 130), the processor then scans all the stored maximum noise levels (in step 132) to identify the "optimum" phase angle that resulted in the lowest maximum noise level. The processor 32 then sends a signal to the synchrophaser 14 (in step 134) to adjust the slave propeller 42 so that its phase angle (relative to the master propeller 36) is now the optimum phase angle calculated. The routine is then exited (step 136) until a new flight condition (e.g., a propeller RPM change by the pilot) is sensed by the synchrophaser. This starts another determination as to whether the phase angle needs to be adjusted again.

Instead of using microphones (for measuring noise), other transducers could be used for various sampling, such as velocity pickups or accelerometers (for measuring vibration).

Applicant envisions that a preferred system would employ a combination of microphones and vibration sensors to reduce both aircraft cabin noise and vibration, as described in U.S. Pat. No. 5,148,402 to Magliozzi et al., that patent being hereby incorporated by reference. The microphones would operate as previously described. Similarly, commercial vibration sensors (similar to items 16–22 of FIG. 1) could be mounted on seat rails, seat legs, fuselage frames, or wing boxes to sample the vibration levels. For those, the required frequency range is 10 to 50 Hz. Separate signal conditioners (similar to item 26 in FIG. 1) could be employed for each "microphone" and "vibration" channel to shape the signal for input to the multiplexer. Then, a similar mathematical analysis as described hereinbefore with respect to FIG. 2 and noise would be performed for determining the optimum phase angle based also on the vibration measurements.

It should be understood by those skilled in the art that other obvious modifications can be made without departing from the spirit of the invention. For example, the shaft phase angles can be surveyed at 0.1° increments, if preferred. Accordingly, reference should be made primarily to the accompanying claims, rather than the foregoing specification, to determine the scope of the invention.

What is claimed is:

1. A method of reducing acoustic noise in an aircraft cabin during flight, the aircraft having at least two propellers, said method comprising the steps of:

a. setting a phase angle relationship between the aircraft propellers by using an associated synchrophaser;

b. sensing a noise signal at each of a plurality of noise transducers disposed at various locations throughout the cabin, each noise signal being indicative of the cabin noise level based on flight conditions at the set phase angle;

c. converting each noise signal from analog to digital and transmitting the converted noise signal to a digital signal processor;

d. comparing each converted noise signal in the processor to identify the maximum noise level signal generated at any transducer at that phase angle and storing a resulting signal which characterizes that maximum noise level and associated angle;

e. repeating steps (b)–(d) for each of a plurality of other, incremental phase angles;

f. determining, from among all of the resulting signals, the signal indicative of both a lowest maximum noise level and its associated propeller phase angle; and g. generating a control signal from the processor to the synchrophaser to set the phase angle relationship between the propellers to that value determined in step (f) above, thereby reducing the cabin noise to correspond to the lowest maximum noise level at any of the transducer locations.

2. The method of claim 1 wherein the noise level at each transducer is re-calculated upon a new flight condition, and the synchrophaser is reset to a newly identified phase angle, if different than the existing set phase angle.

3. A method of reducing vibration in an aircraft cabin during flight, the aircraft having at least two propellers, said method comprising the steps of:

a. setting a phase angle relationship between the aircraft propellers by using an associated synchrophaser;

b. sensing a vibration signal at each of a plurality of vibration sensors in the cabin, each vibration signal being indicative of the vibration level based on flight conditions at the set phase angle;

c. converting each vibration signal from analog to digital and transmitting the converted vibration signal to a digital signal processor;

d. comparing each converted vibration signal in the processor to identify the maximum vibration level signal generated at any vibration sensor at that phase angle and storing a resulting signal which characterizes that maximum vibration level and associated angle;

e. repeating steps (b)–(d) for each of a plurality of other, incremental phase angles;

f. determining, from among all of the resulting signals, the signal indicative of both a lowest maximum vibration level and its associated propeller shaft phase angle; and g. generating a control signal from the processor to the synchrophaser to set the phase angle relationship between the propellers to that value determined in step (f) above, thereby reducing the cabin vibration to the lowest maximum vibration level at any of the sensor locations.

4. The method of claim 3 wherein the vibration level at each sensor is re-calculated upon a new flight condition, and the synchrophaser is reset to a newly identified optimum phase angle, if different than the existing set phase angle.

5. Apparatus, disposed on an aircraft having at least two propellers, operable to set a phase angle between the propellers to an desired value, said apparatus comprising:

a. sensing means, disposed throughout various locations on the aircraft, for sensing a predetermined aircraft parameter at each of the aircraft locations and for providing a corresponding sensed signal for each of the aircraft locations;

b. synchrophaser means, responsive to a phase angle signal, for setting a phase angle between the propellers to a predetermined value; and c. signal processing means, responsive to each of the sensed signals, for incrementally setting the phase angle signal to a series of values, for comparing, at each incremental value of the phase angle signal, the sensed signals to determine the sensed signal with a predetermined characteristic, and for comparing all of the sensed signals with the predetermined characteristic to determine the sensed signal having a predetermined quality and for setting an in-flight value of the phase angle signal equal to the phase angle associated with the determined sensed signal with the predetermined quality.

6. The apparatus of claim 5, wherein the predetermined aircraft parameter is noise in a cabin of the aircraft.

7. The apparatus of claim 6, wherein the predetermined characteristic is a maximum noise level in the aircraft cabin.

8. The apparatus of claim 7, wherein the predetermined quality is a lowest maximum noise level in the aircraft cabin.

9. The apparatus of claim 5, wherein the predetermined aircraft parameter is vibration of the aircraft.

10. The apparatus of claim 9, wherein the predetermined characteristic is a maximum vibration level of the aircraft.

11. The apparatus of claim 10, wherein the predetermined quality is a lowest maximum vibration level on the aircraft.

12. The apparatus of claim 5, further comprising signal conditioning means for conditioning each of the sensed signals.

13. The apparatus of claim 5, further comprising multiplexer means for selecting one of the sensed signals to be input to the signal processing means.

14. The apparatus of claim 5, wherein one or more of the sensed signals are in analog form, and further comprising means for converting the one or more sensed signals in analog form to a corresponding digital form for input to the signal processing means.

* * * * *